Patented Oct. 1, 1946

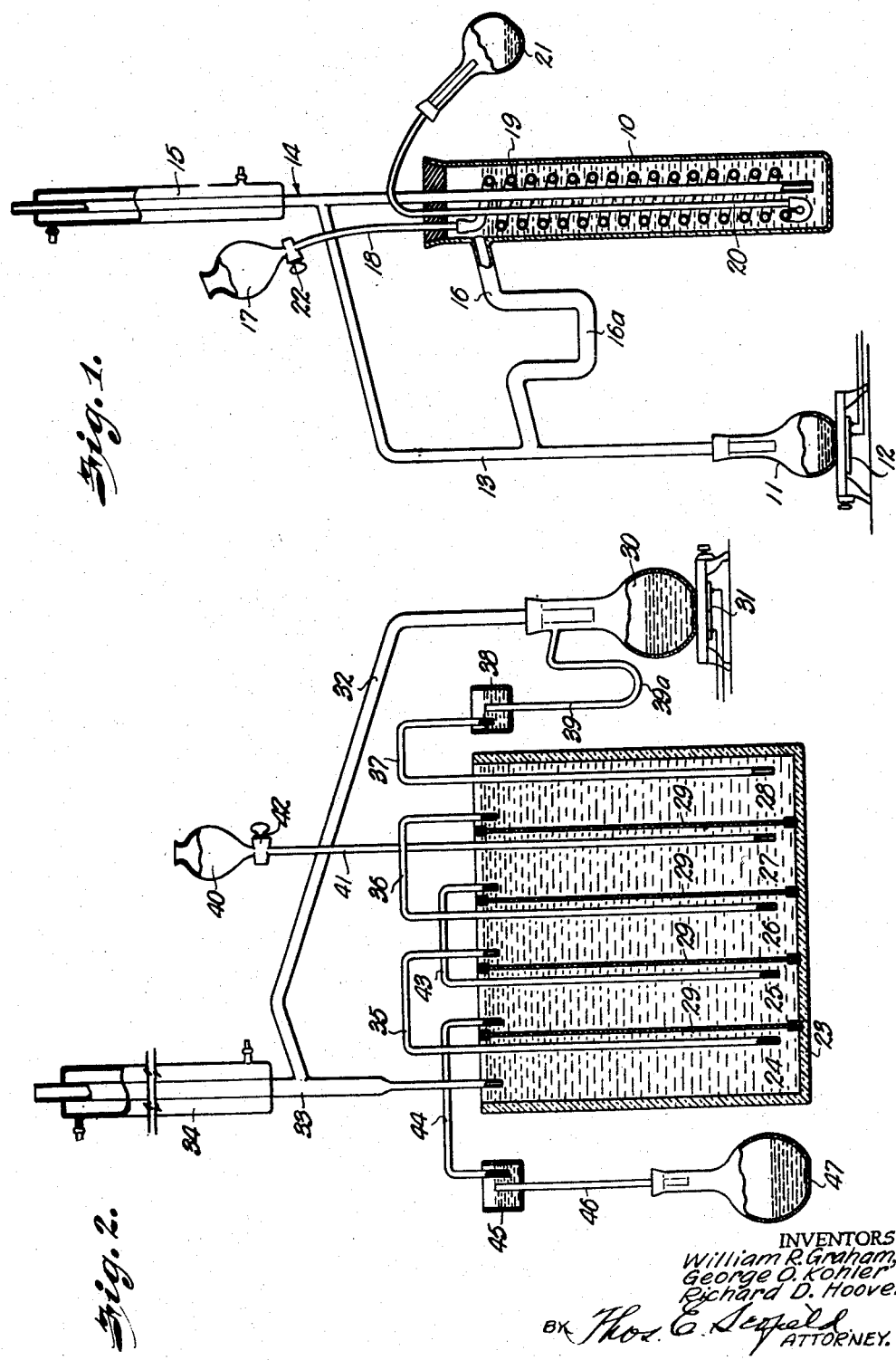

2,408,625

UNITED STATES PATENT OFFICE 2,408,625

METHOD OF SEPARATING CHLOROPHYLL FROM VITAMINS AND OTHER FAT SOLUBLE MATERIALS

William R. Graham, Jr., Kansas City, and George O. Kohler, Mission, Kans., and Richard D. Hoover, Kansas City, Mo., assignors to American Dairies Incorporated, Kansas City, Mo., a corporation of Maryland, and The Quaker Oats Company, Chicago, Ill., a corporation of New Jersey Application June 5, 1942, Serial No. 445,958

4 Claims. (Cl. 210—8.5)

Our invention relates to a method of and apparatus for separating and concentrating carotene, vitamins, xanthophyll, and other fat soluble organic material from chlorophyll and other nondialyzable solutes in plants such as grass, alfalfa, spinach, or other vegetable matter. The process may also be employed to separate and concentrate the carotene, vitamins, xanthophyll and other fat soluble organic material from other non-dialyzable materials in plants containing no chlorophyll such as carrots or sweet potatoes.

We have found that certain fractions of a fat soluble extract from plants will dialyze through a rubber or synthetic rubber membrane while other fat soluble fractions in the solution will not. For instance, if all of the fat soluble materials are extracted from a suitable plant material, the carotene, vitamins and certain other materials will pass through the membrane while the chlorophyll and certain other materials will not diffuse through the membrane. When extracting carotene, vitamin K, xanthophyll, and other fat soluble material from the plant material, it is desirable to remove the chlorophyll for the reason that chlorophyll, while harmless, imparts an undesirable green color to the vitamin solution. Also, when isolated in its pure form, chlorophyll is a valuable byproduct.

Sterols both from plant and animal sources will also pass through the rubber or synthetic rubber membrane. Thus, this method may also be used to separate sterols from other fat soluble materials.

Many of the materials in the chloroplast are labile and are destroyed or altered by addition of certain chemicals. This characteristic of these materials has made their separation and isolation a difficult task.

In the past, the Schertz process has been extensively used. A description of this process may be found in volume 30, page 1073 of Industrial & Engineering Chemistry, published in 1930. The Schertz process employs a hydrocarbon solvent to extract the carotene leaving the bulk of the chlorophyll in the cake. Then an 85% acetone extraction is employed to remove the chlorophyll. One disadvantage of this method is that it requires two separate extractions of the meal with different solvents. Thus two separate solvent recovery systems must be used and the total quantity of solvents is disproportionately large. Another difficulty with this process is that the first extraction is not sufficiently "selective" and considerable amounts of chlorophyll are extracted with the carotene.

We have discovered a method of separating chlorophyll from vitamins which requires the use of only one solvent. A suitable plant material, such as grass, alfalfa or spinach, which contains vitamins and chlorophyll, is treated in this manner. The plant material is first partially dried to remove a substantial part of the natural moisture content from the plant cells. The dried material is pulverized and then extracted with a fat solvent such as pentane, hexane, heptane, petroleum ether, benzene, acetone, butyl alcohol, ethylene dichloride, or other fat solvents or mixtures of such solvents. This solution, preferably in relatively concentrated form, is then dialyzed through a membrane made of rubber, synthetic rubber, or the like, into a fresh solvent. The carotene, vitamins, xanthophyll and other fat soluble materials pass through the membrane into the fresh solvent while the bulk of the chlorophyll remains behind.

An important object of our invention, therefore, is the provision of a novel method of separating carotene, vitamins and other fat soluble materials from chlorophyll and other materials that requires the use of but one solvent.

Another object of our invention is the provision of a method of the above mentioned character that may be easily and inexpensively practiced.

Other objects and advantages of our invention will be apparent during the course of the following description.

In the drawing forming a part of this specification and wherein like numerals are employed to designate like parts throughout the same:

Fig. 1 is a side elevation of an apparatus that may be used to practice our process, parts of the apparatus being shown in section for clearness of illustration, and Fig. 2 is a side elevation of another form of apparatus that may be used to practice our process, parts being shown in section and parts in elevation.

Referring now to the apparatus shown in Fig. 1, the numeral 10 designates a separating tank adapted to be filled with a fat solvent such as heptane. Flask 11 also contains a quantity of the selected solvent. The contents of the flask are heated by an electric element 12. When the solvent in flask 11 is heated, the vapors rise through tube 13 and into the upper portion of tube 14 which extends through a condenser 15. As the vapors enter tube 14 they condense and gravitate downwardly through the lower portion of the tube which extends into and has its lower end near the bottom of separating tank 10. Thus, flask 11 will continuously supply tank 10 with fresh solvent. An overflow tube 16, having a trap portion 16a, connects the upper end of tank 10 with tube 13. The overflow tube is preferably tilted slightly from the horizontal so that overflow liquid from tank 10 will pass through tube 16 into pipe 13 and back into flask 11. A concentrated solution of plant material is introduced at the separatory funnel 17 and is conducted through connecting pipe 18 to a rubber or synthetic rubber tube coil 19. Neoprene tubes are conventional and satisfactory.

The lower or discharge end of the coiled tube 19 is connected to tube 20 which discharges into a flask 21. Container 10 and flask 11 are equipped with suitable stoppers assuring liquid tight connections around the inlet and discharge tubes. Introduction of the plant concentrate to the system is controlled by valve 22.

As a typical example of the method as practiced in the apparatus shown in Fig. 1, a quantity of alfalfa was passed through a drum type dryer having an intake temperature of approximately 1600° F. and an outlet temperature of approximately 250° F. The green plant material remained in the dryer only sufficiently long to remove a substantial amount of the natural plant moisture without material discoloration or charring of the chlorophyll. This preliminary drying step is not essential but we have found that it facilitates the later separation of the chlorophyll fraction from the other fat soluble materials.

The dried plant material was then passed through a hammer mill and ground to a fine powder. After grinding, the powdered plant material or pigment was mixed with sufficient heptane to dissolve the fat soluble materials from the plants. This solution was then passed through a still to remove part of the solvent leaving the solution in relatively concentrated form. 250 ml. of this concentrated solution was then poured into separatory funnel 17. Valve 22 was opened and the concentrate permitted to flow slowly through tube 18 and coiled tube 19. Simultaneously fresh solvent was introduced to the bottom of the tank 10 through pipe 14 and was circulated around the exterior of the coiled tube 19 overflowing from the tank through pipe 16 back to flask 11. Throughout the entire operation, heater 12 causes a constant circulation of solvent through the apparatus as previously explained. As the plant extract passes slowly through neoprene tube 19, the carotene, vitamin K, xanthophyll, etc., diffuse through the wall of the neoprene tube and into the heptane solvent in tank 10. The diffusate containing the vitamin material overflows tank 10 through pipe 14 into flask 11.

The chlorophyll and other non-dialyzable materials are retained within neoprene tube 19 and are discharged as a dialyzate through tube 20 into flask 21. About five hours is required to pass 250 ml. of solution through the apparatus.

All of the vitamins will not be extracted from the plant solution the first time it passes through the apparatus. Therefore, after the first pass, we remove the diffusate from flask 11 and fill the flask with fresh solvent. The dialyzate in flask 21, which is a dark green color and contains practically all of the chlorophyll, is then poured back into separatory funnel 17. Satisfactory results are obtained if the plant material is passed approximately six times through the apparatus.

The following table shows the results of an actual experiment conducted as outlined above.

| Sample | Carotene | | Chlorophyll | | Ratio, chlorophyll to carotene |
|---|---|---|---|---|---|
|  | Total in fraction, mg. | Percent recovery | Total in fraction, mg. | Percent recovery |  |
| 1st diffusate | 70.6 | 23.4 | 138 | 2.6 | 1.96 |
| 2nd diffusate | 64.8 | 21.5 | 167 | 3.1 | 2.58 |
| 3rd diffusate | 47.0 | 15.6 | 116 | 2.2 | 2.47 |
| 4th diffusate | 58.3 | 19.3 | 172 | 3.2 | 2.95 |
| 5th diffusate | 33.8 | 11.2 | 154 | 2.9 | 8.08 |
| 6th diffusate | 13.8 | 4.6 | 100 | 1.9 | 7.25 |
| Total diffusates | 288.3 | 95.6 | 847 | 15.9 | 2.94 |
| Dialyzate | 13.2 | 4.4 | 4,536 | 84.1 | 343.00 |

It should be noted that 95.6 per cent of the carotene (pro-vitamin A) in the solution was recovered, while only 15.9 per cent of the chlorophyll diffusate passed through tube 19. A biological chick assay indicated that 98.5 per cent of the total vitamin K present was recovered in the diffusate. Qualitative analyses have demonstrated that a high percentage of the xanthophyll also diffuses through tube 19.

Explaining now the operation of the apparatus shown in Fig. 2, wherein a series of membranous sheets or films are used in place of the neoprene tube 19 in Fig. 1. This apparatus operates more rapidly and handles greater quantities of plant material than the apparatus shown in Fig. 1. Describing now the portion of the apparatus that permits a constant circulation of liquid solvent. An essentially rectangular tank 23 is divided into chambers 24, 25, 26, 27, and 28 by membranes 29 of rubber or synthetic rubber. A flask 30 is heated by an electrical heating element 31. A tube 32 extends from flask 30 and connects with a pipe 33. The upper portion of pipe 33 is enclosed by a condenser 34 and the lower portion of the pipe extends into chamber 24. Siphon tube 35 connects chamber 24 with chamber 26 and siphon tube 36 connects chamber 26 with chamber 28. A siphon tube 37 connects chamber 28 with a constant level device 38. Liquid discharged into the constant level device flows through trap 39a in tube 39 to flask 30. Chambers 24, 25, 26, 27 and 28, constant level devices 38 and 45, and flask 30 are filled with a solvent such as heptane. When the apparatus is set up, the siphon tubes 35, 36, 37, 43 and 44 are also filled with the solvent so that a siphoning action can take place. The liquid in flask 30 is heated. Vapors passing off through pipe 32 are condensed and the condensate discharged into chamber 24. As the liquid in chamber 24 tends to rise, hydrostatic pressure forces liquid from the bottom of the chamber to pass through siphon tube 35 to chamber 26, from chamber 26 the liquid passes through siphon tube 36 to chamber 28, thence through siphon tube 37, constant level 38 and pipe 39 to the flask 30.

The crude plant extract or concentrate, introduced through separatory funnel 40, is allowed to flow through tube 41 controlled by valve 42, into chamber 27. A siphon tube 43 connects chamber 27 with chamber 25. A siphon tube 44 connects chamber 25 with a constant level device 45. Liquid delivered to the constant level device 45 overflows into tube 46 which conducts it into a flask 47.

As an example of a typical operation, a concentrated heptane solution of plant material prepared in the manner hereinbefore described was placed in container 40. In actual practice, container 40 is much larger than shown in the drawing. The heptane solvent was then placed in the apparatus as described above. A constant circulation of the solvent was effected by heating element 31. Valve 42 was opened sufficiently to permit the extract in container 40 to slowly enter chamber 27 through tube 41. As the solution of plant material tends to rise in chamber 27, the carotene, vitamin K, xanthophyll, etc., diffuse through rubber membranes 29 into chambers 26 and 28 while the chlorophyll and other non-dialyzable materials will remain in chamber 27 and be transferred to chamber 25 through siphon tube 43. The vitamins entering the solvent in chamber 28 will pass through tubes 37 and 39 into flask 30. Vitamin materials diffused into chamber 26 pass into chamber 28 through siphon tube 36. Vitamins remaining in chamber 27 pass into chamber 25 through tube 43 where dialysis again takes place. In chamber 25, the carotene, xanthophyll and vitamins again diffuse through membranes 29 and are taken up by the solvent in chambers 24 and 26. The materials not diffused through the membranes pass off from chamber 25 through pipe 44 into constant level device 45, thence into flask 47 through pipe 46. Thus, the carotene, xanthophyll and vitamins accumulate in flask 30, while the chlorophyll and other non-dialyzable materials accumulate in flask 47. Solvent in the vitamin and chlorophyll solutions is then removed by processes well known to the art as by passing live steam through the residue under vacuum after distillation. The greater membrane surface of this apparatus greatly decreases the time required to separate the crude chlorophyll from the other fat soluble materials. This apparatus also permits the use of thinner membranes than is possible where a coiled tube is used to speed up dialysis. We have found that three passes of the dialyzate are generally sufficient to obtain a satisfactory separation. To recirculate the plant material, the dialyzate is removed from flask 47 and returned to separatory funnel 40. The results of a typical experiment using this apparatus are given in the following table.

| Sample | Carotene | | Chlorophyll | | Ratio, chlorophyll to carotene |
|---|---|---|---|---|---|
| | Total in fraction, mg. | Percent recovery | Total fraction | Percent recovery | |
| 1st diffusate | 280 | 48.7 | 583 | 5.8 | 1.9 |
| 2nd diffusate | 124 | 21.6 | 361 | 3.9 | 2.9 |
| 3rd diffusate | 102 | 17.7 | 464 | 5.0 | 4.6 |
| Total diffusates | 506.0 | 88.0 | 1,358 | 14.7 | 2.68 |
| Dialyzate | 68.6 | 12.0 | 7,870 | 85.3 | 114.6 |

It will be noted that 88 per cent of the carotene was recovered in three passes of the plant solution through the apparatus and that only 14.7 per cent of the chlorophyll was recovered with the carotene.

We have tried many types of dialysis membranes but have found rubber or synthetic rubber membranes to be most satisfactory. We have found that a vulcanized rubber membrane stands up against the solvent longer than a natural rubber such as latex. The following membranes were tested and, in each instance, it was found that very little, if any, of the carotene or xanthophyll dialyzed through the membrane; collodion, paper parchment, animal parchment, "pliofilm," "lucite," cellulose acetate, animal intestine, animal intestine (bile salts added), fiber tubing, paper impregnated with gelatin, and Cellophane.

A number of fat solvents have been found to be satisfactory. Among the solvents tested were petroleum ether, acetone, ethylene dichloride, benzene, butyl alcohol, and various of the normally liquid homologs of hexane, including pentane, hexane, and heptane.

It may thus be seen that we have accomplished the objects of our invention. We have provided a highly efficient method of separating carotene, vitamins, xanthophyll, etc. from a fat solvent extract of plant materials. We have provided suitable apparatus for practicing the process. The process requires the use of but one solvent and by using the one solvent a high percentage of vitamin yield is obtained. The process may be easily and inexpensively practiced.

It is to be understood that the forms of the invention herewith shown and described are to be taken as preferred examples of the same and that changes may be made in the apparatus and method which do not depart from the spirit of our invention or the scope of the appended claims.

Having thus described our invention, we claim:

1. A method of separating fat soluble vitamins and pro-vitamins from extraneous organic material contained in a fat solvent extract of plant materials by dialyzation utilizing a membrane capable of diffusing the vitamins and pro-vitamins, comprising the steps of passing the fat solvent mixture and a relatively uncontaminated fat solvent on opposite sides of the membrane to selectively diffuse the vitamins and pro-vitamins through the membrane into the uncontaminated solvent, separately removing the vitamin and pro-vitamin containing solvent and the solvent containing the organic materials, and recovering the vitamins and pro-vitamins from its solvent.

2. A method of separating fat soluble vitamins and pro-vitamins from chlorophyll contained therewith in a fat solvent extract of plant materials by dialyzation utilizing a membrane capable of diffusing the vitamins and pro-vitamins, comprising the steps of passing the fat solvent mixture and a relatively uncontaminated fat solvent on opposite sides of the membrane to selectively diffuse the vitamins and pro-vitamins through the membrane into the uncontaminated solvent, separately removing the vitamin and pro-vitamin containing solvent and the solvent containing chlorophyll and recovering the vitamins and pro-vitamins from its solvent.

3. A method of separating fat soluble vitamins and pro-vitamins from extraneous organic material contained therewith in a fat solvent extract of plant materials by dialyzation utilizing a membrane selected from the class consisting of rubber and synthetic rubber, comprising the steps of passing the fat solvent mixture and a relatively uncontaminated fat solvent on opposite sides of the membrane to selectively diffuse the vitamins and pro-vitamins through the membrane into the uncontaminated solvent, separately removing the vitamin and pro-vitamin containing solvent and the solvent containing the organic materials and recovering the vitamins and pro-vitamins from its solvent.

4. A method of separating fat soluble vitamins and pro-vitamins from chlorophyll contained therewith in a fat solvent extract of plant materials by dialyzation utilizing a membrane selected from the class consisting of rubber and synthetic rubber, comprising the steps of passing the fat solvent mixture and a relatively uncontaminated fat solvent on opposite sides of the membrane to selectively diffuse the vitamins and pro-vitamins through the membrane into the uncontaminated solvent, separately removing the vitamin and pro-vitamin containing solvent and the solvent containing chlorophyll and recovering the vitamins and pro-vitamins from its solvent.

WILLIAM R. GRAHAM, Jr.
GEORGE O. KOHLER.
RICHARD D. HOOVER.